US007063882B2

(12) United States Patent
Mossbrook et al.

(10) Patent No.: US 7,063,882 B2
(45) **Date of Patent: *Jun. 20, 2006**

(54) PRINTED THERMOPLASTIC FILM WITH RADIATION-CURED OVERPRINT VARNISH

(75) Inventors: Mendy J. Mossbrook, Moore, SC (US); David R. Kyle, Moore, SC (US); Marc A. Edlein, Belton, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/920,866

(22) Filed: Aug. 18, 2004

(65) Prior Publication Data

US 2005/0019533 A1 Jan. 27, 2005

Related U.S. Application Data

(63) Continuation of application No. 09/588,405, filed on Jun. 6, 2000.

(51) Int. Cl.
*B32B 3/00* (2006.01)
*B32B 7/14* (2006.01)

(52) U.S. Cl. ....................... 428/203; 428/213; 428/500; 426/87; 426/106; 426/127; 426/383; 426/415; 427/510; 427/511

(58) Field of Classification Search ................ 428/203, 428/213, 500; 426/87, 106, 127, 383, 415; 427/510, 511
See application file for complete search history.

(56) References Cited

U.S. PATENT DOCUMENTS

| | | | |
|---|---|---|---|
| 3,850,675 | A | 11/1974 | Miller |
| 3,936,557 | A | 2/1976 | Watt |
| 3,978,260 | A | 8/1976 | Dobbins et al. |
| 3,989,609 | A | 11/1976 | Brack |
| 4,008,115 | A | 2/1977 | Fairbanks et al. |
| 4,064,296 | A | 12/1977 | Bornstein et al. |
| 4,070,497 | A | 1/1978 | Wismer et al. |
| 4,120,716 | A | 10/1978 | Bonet |
| 4,197,344 | A | 4/1980 | Tshudy |
| 4,309,452 | A | 1/1982 | Sachs |
| 4,410,560 | A | 10/1983 | Kosterka |
| 4,439,480 | A | 3/1984 | Sachs et al. |
| 4,647,475 | A | 3/1987 | Inukai et al. |
| H304 | H | 7/1987 | Vorrier et al. |
| 4,842,906 | A | 6/1989 | Ekdahl et al. |
| 4,879,430 | A | 11/1989 | Hoffman |
| 4,935,288 | A | 6/1990 | Honaker et al. |
| 5,019,202 | A | 5/1991 | Kawahata et al. |
| 5,070,121 | A | 12/1991 | Hinterwaldner et al. |
| 5,084,344 | A | 1/1992 | Harada et al. |
| 5,330,799 | A | 7/1994 | Sandor et al. |
| 5,379,697 | A | 1/1995 | Ertl |
| 5,407,708 | A | 4/1995 | Lovin et al. |
| RE35,203 | E | 4/1996 | Wakalopulos |
| 5,562,951 | A | 10/1996 | Kamen |
| 5,645,639 | A | 7/1997 | Doesburg et al. |
| 5,744,248 | A | 4/1998 | Meixner et al. |
| 5,763,048 | A | 6/1998 | Takahashi |
| 5,804,301 | A | 9/1998 | Curatolo |
| 5,846,620 | A | 12/1998 | Compton |
| 5,888,649 | A | 3/1999 | Curatolo et al. |
| 5,945,183 | A | 8/1999 | Johnson |
| 6,426,507 | B1 | 7/2002 | Rangwalla et al. |
| 6,438,306 | B1 | 8/2002 | Bishop et al. |

FOREIGN PATENT DOCUMENTS

| | | | |
|---|---|---|---|
| EP | 0 089 629 | A3 | 9/1983 |
| EP | 0 544 052 | B1 | 6/1993 |
| EP | 0 737 593 | A2 | 10/1996 |
| GB | 2 284 787 | A | 6/1995 |
| JP | 57-059968 | | 4/1982 |
| JP | 57/157785 | | 9/1982 |
| JP | 60-202767 | | 10/1985 |
| JP | 02117826 | | 2/1990 |
| JP | 6-8391 | | 1/1994 |
| JP | 6-8392 | | 1/1994 |
| JP | 9-302264 | | 11/1997 |
| JP | 11-10823 | | 1/1999 |
| WO | 98/51437 | | 11/1998 |

OTHER PUBLICATIONS

McIntyre, "UV–Cured Durable Top Coats: A Replacement for OPP & PET Film Laminations," Presented at Future–Pak 1997, Oct. 28–29, 1997 (together with MCTC–2138 & 2139 Data Sheets).

(Continued)

*Primary Examiner*—B. Shewareged
(74) *Attorney, Agent, or Firm*—Daniel B. Ruble

(57) ABSTRACT

A packaged food product includes a food product and a package enclosing the food product. The package may be formed from a coated, printed film that includes a substrate film including one or more thermoplastic materials and having an average thickness of less than about 15 mils. An image is printed on the print side of the substrate film. A radiation-cured varnish covers the printed image. The radiation-cured varnish was formed by coating the printed image with a radiation-curable varnish that includes one or more polymerizable reactants and optionally one or more photoinitiators. The radiation-curable varnish is subsequently exposed to radiation sufficient to polymerize at least 90 weight % of the polymerizable reactants. When the coated, printed film is tested according to the FDA migration test protocol, no more than 50 parts per billion total of any of the polymerizable reactants and the optional photoinitiators migrate within 10 days at 40° C. from the coated, printed film into a food simulant of 95 weight % ethanol and 5 weight % water enclosed within a test container formed from the coated, printed film so that the food simulant contacts the food side of the substrate film and the ratio of volume of food simulant to surface area of coated, printed film is 10 milliliters per square inch.

72 Claims, No Drawings

OTHER PUBLICATIONS

Davis et al., "Chemistry Considerations for Low–Voltage EB Applications," RadTech Report, pp. 18–20, Sep./Oct. 1996.

Dionne, "Can the energy–curing industry cash in on food–packaging opportunities?" Converting Magazine's Flex–Pack Management, , vol. 4, No. 1, pp. 2–3 (Jan. 1, 1998).

Dionne, "UV/EB Curing stakes a claim on flexo–printed food packaging" Converting Magazine's Flex–Pack Management, p. 3 (Feb. 1, 1998).

Wakalopulos, "Low Voltage or Ultra Low Voltage?. . . ," Radtech Report, pp. 10–15 (Jul./Aug. 1998).

Morton Adhesives, Mor–Quik® 477 Coating Data Sheets (Feb. 22, 1998).

Morton Adhesives, Mor–Quik® 333 Coating Data Sheets (Sep. 2, 1998).

Morton International, Mor–Quik 477 Material Safety Data Sheet, pp. 1–6 (Jan. 29, 1999).

Northwest Coatings Corp., "Adhesives and Coatings that Exceed our Customers' Expectations," Product Brochures and Product Sheets.

Fletcher, "New Lower–Voltage EB Systems for Curing Polymers and Coatings," Journal of Coatings Technology, vol. 65, No. 822, pp. 61–63 (Jul. 1993).

Burkart, "Product Trend Report: UV Inks and Curing," Flexo, pp. 46–49 (Sep. 1997).

Ravijst, "Radiation Cure Applications in the Packaging Industry," Packaging India, pp. 107–109 (Dec. '97).

Guarino, "A Review of Properties and Uses of Radiation Curing for the Near Term and Future," 1990 Polymers, Laminations & Coatings, pp. 891–893 (TAPPI Proceedings 1990).

Pierce & Stevens Corp., Miracure EB Curable Coatings, Product Brochure, "Formulated for Success: Coatings & Adhesives for Packaging and Graphic Arts" (Nov. 1998).

Friedman, "Where Materials and Minds Meet," Package Printing, pp. 24–26 (Feb. 2000).

Leach et al, The Printing Ink Manual, Chapter 11, pp. 636–677 (Fifth Ed., Kluwer Academic Publishers 1993).

Clinkunbroomer, "Though the Future is Bright for UV Inks, Wide Web Flexo Market Remains Elusive," American Ink Maker, pp. 23–26 (Sep. 1998).

Mcintyre, "'Total Package Concept:' Electron Beam Technology for Barrier, Adhesive, and Overcoat Applications," Presented at Future–Pak '95 (20 pages) (Sep. 13–15, 1995).

Harris, "UV Coating—beyond stick and shine," FlexoTech, pp. 21–22 (Jun. 1998).

Pike, "Optical properties of Packaging Materials," Journal of Plastic Film & Sheeting, vol. 9, Jul. 1993, pp. 173–179.

Lauppi et al, "Advantages of Low Voltage Electron Beam Processing (80 kV–110 kV)," Europe '99 RadTech Conference Proceedings, Berlin, Germany, pp. 357–366 (Nov. 8–10, 1999).

Sun Chemical Corp., GAIFBO440206 Material Safety Data Sheet, pp. 1–9 (Apr. 21, 1999).

Fred McIntyre, "The Practical Implications of EB Hybrids", pp. 76–78, Feb. 1996.

Correspondence from T. Durling to D. Ruble dated May 10, 2004.

Morton Int'l Inc., Material Safety Data Sheet for Mor–Quick 333 (Nov. 10, 1998).

Morton Int'l Inc., Material Safety Data Sheet for Mor–Quick 444 HP (Oct. 20, 1998).

PRINTED THERMOPLASTIC FILM WITH RADIATION-CURED OVERPRINT VARNISH

This application is a continuation application under 35 U.S.C. § 120 of pending prior U.S. patent application Ser. No. 09/588,405 filed Jun. 6, 2000 by Mossbrook et al for "Printed Thermoplastic Film with Radiation-Cured Overprint Varnish," which is incorporated herein in its entirety by reference.

BACKGROUND OF THE INVENTION

The present invention relates to printed thermoplastic food-packaging films, and more particularly to a food product enclosed within a package formed from a printed film having a radiation-cured varnish covering the printed image of the film.

Printed thermoplastic films are in wide use for food packaging. For example, printed thermoplastic films are used with the vertical form-fill-seal (VFFS) packaging process to package several types of food products—such as solid or particulate food products (e.g., fresh cut produce, shredded cheese, or frozen chicken wings and nuggets) and liquified foods (e.g., soups and beverages). In a typical VFFS packaging process, a tubular film is provided, for example, by longitudinally heat sealing a printed film to itself to form the tube. This longitudinal seal may be formed as a lap seal or a fin seal. The tube is then heat-sealed transversely at its lower end to form the bottom of a pouch. The food product to be packaged flows through a vertical fill line and into the pouch. After filling, the pouch is closed by transversely heat sealing the open, upper end of the pouch to form a sealed pouch. Typically, this top transverse seal severs the sealed pouch from the tubular film above it, while simultaneously forming the bottom transverse seal of the next pouch.

An image that is printed on the film from which the VFFS package is formed often extends into the heat sealed regions of the VFFS package. As a result, the printed ink system that forms the image must be able to withstand the heat applied during the heat seal process, without smearing or otherwise degrading or distorting the appearance properties of the printed image (e.g., gloss). The printed ink system must also withstand the flexing, abrasion, and rub conditions associated with the packaging application. A water or solvent-based ink system applied to the surface of the thermoplastic film (i.e., "face-printed" film) typically will not withstand such exposure. For example, many surface-printed inks melt or stick to the heat seal jaw during the heat-sealing process.

Considerations such as those discussed above with respect to VFFS packaging also exist for: 1) horizontal form-fill-seal ("HFFS") packaging and 2) packaging that uses a lidding thermoplastic film heat-sealed to a bottom tray, cup, or thermoformed container. These types of packaging applications are well known in the packaging industry. For example, hot dogs are often packaged in a film-lidded thermoformed package having a flexible bottom portion. Meat and poultry is often packaged in a film-lidded foam or other semi-rigid bottom tray. Yogurt and other dairy products are often packaged in a film-lidded rigid cup-like bottom portion.

A suitable "trap-print" film may help prevent the heat-seal distortion of the printed image on the thermoplastic film used in VFFS, HFFS, or lidding applications. A trap-print film sandwiches the printed ink between a substrate film layer and a top film layer that is laminated to the substrate film. As such, the top film helps to protect the printed image from heat distortion and degradation. However, a trap-print film requires the additional manufacture step of laminating the top film to the film substrate, and therefore is generally more expensive and complicated to manufacture.

If a trap-print film is not used, then water- and solvent-based overprint varnishes may be used to cover and enhance the protection of the underlying printed ink image. However, such overprint varnishes are generally based on formulations that are similar to the underlying inks (absent the pigment), and are therefore subject to the same heat and abuse limitations as the underlying printed ink. Further, while such overprint varnish systems may provide enhanced attributes in one or more of the areas of heat resistance, flexibility (i.e., crack resistance), abrasion resistance, and gloss—they have not always provided acceptable attributes in all four areas.

Generally, printing inks and overprint varnishes applied to packaging films in food applications are printed so that the ink or varnish will not directly contact the packaged food product. For example, the ink may be surface-printed on the non-food side, outside (i.e., the side opposite the food-contact side) of the packaging film. Nevertheless, concern exists that one or more components of a surface-printed ink system and/or overprint varnish may migrate through the packaging film to directly contact the packaged food. If a component does migrate to contact the packaged food, then the U.S. Food and Drug Administration (FDA) considers the component an indirect "food additive." Most printed ink and overprint varnish components and systems are not FDA-approved as either direct or indirect food additives. Accordingly, it is important to establish that each component of a printed ink system for food-packaging films will not reasonably be expected to migrate through the substrate film to contact the packaged food.

To establish that a printed ink or overprint varnish component will not migrate through the printed film in a significant amount, a packager will typically conduct a migration study. Generally, a properly conducted migration study for a printed ink system for a packaging film is one that accurately simulates the condition of actual packaging use—and also uses analytical methods sensitive to the equivalent of 50 parts per billion (ppb). A reliable migration study for a printed packaging film typically involves either forming the film into a package that is filled with a food-simulating solvent (i.e., "food simulant") or by installing a specimen of the printed film in a migration cell for extraction by the food simulant. The volume of food simulant-to-film surface area should reflect the ratio expected to be encountered in the actual packaging application. The FDA set forth the protocol for obtaining reliable migration data; the FDA migration study protocols are discussed in "Recommendations for Chemistry Data for Indirect Food Additive Petitions," Chemistry Review Branch, Office of Premarket Approval, Center for Food Safety & Applied Nutrition, Food & Drug Administration (June, 1995), which is incorporated in its entirety by reference. A typical fatty-food simulant for the migration test is 95 weight % ethanol and 5 weight % water. A typical aqueous-food simulant for the migration test is 5 weight % ethanol and 95 weight % water. A representative food simulant-volume to film-surface area is 10 milliliters per square inch. The migration test may be conducted, for example, at 40° C. for 10 days.

Radiation-curable inks and varnishes have had some acceptance in a print system for non-food packaging applications—and also for food-packaging applications that use paper or cardboard carton as the print substrate so that the packaged food either does not directly contact the printed packaging material or the print substrate is so thick that there is no reasonable expectation of migration of the printed components into the food. However, radiation-curable ink systems have not found acceptance for use with relatively thin thermoplastic films in food-packaging applications because of the susceptibility of such a system to unacceptable levels of migration into the packaged food of the unreacted monomers, reaction by-products (e.g., photo-degradation products), and/or residual photoinitiator of the radiation-curable ink system.

SUMMARY OF THE INVENTION

The present invention addresses one or more of the the aforementioned problems. In a first aspect, a packaged food product includes a food product and a package enclosing the food product. The package includes a coated, printed film. The coated, printed film includes a substrate film including one or more thermoplastic materials and having an average thickness of less than about 15 mils. An image is printed on the print side of the substrate film. A radiation-cured varnish covers the printed image. The radiation-cured varnish was formed by coating the printed image with a radiation-curable varnish that includes one or more polymerizable reactants and optionally one or more photointiators. The radiation-curable varnish is subsequently exposed to radiation sufficient to polymerize at least 90 weight % of the polymerizable reactants. When the coated, printed film is tested according to the FDA migration test protocol, no more than 50 parts per billion total of any of the polymerizable reactants and the optional photoinitiators migrate within 10 days at 40° C. from the coated, printed film into a food simulant of 95 weight % ethanol and 5 weight % water enclosed within a test container formed from the coated, printed film so that the food simulant contacts the food side of the substrate film and the ratio of volume of food simulant to surface area of coated, printed film is 10 milliliters per square inch.

In a second aspect, a packaged food product includes a food product and a package enclosing the food product. The package includes a coated, printed film. The coated, printed film includes a substrate film including one or more thermoplastic materials and having an average thickness of less than about 15 mils. An image is printed on the print side of the substrate film. A radiation-cured varnish covers the printed image. The radiation-cured varnish was formed by coating the printed image with a radiation-curable varnish that includes one or more polymerizable reactants and optionally one or more photointiators. The radiation-curable varnish is subsequently exposed to radiation sufficient to polymerize at least 90 weight % of the polymerizable reactants. The package includes one or more heat-sealed regions. At least a portion of the radiation-cured varnish extends into the heat-sealed region. The weight of the radiation-cured varnish per unit area of substrate film in the portion of the radiation-cured varnish extending into the heat-sealed region is at least substantially equal to the weight of radiation-cured varnish per unit area of substrate film outside of the heat-sealed region.

In a third aspect, a packaged food product includes a food product and a package enclosing the food product. The package includes a coated, printed film. The coated, printed film includes a substrate film including one or more thermoplastic materials and having an average thickness of less than about 15 mils. An image is printed on the print side of the substrate film. A radiation-cured varnish covers the printed image. The radiation-cured varnish was formed by coating the printed image with a radiation-curable varnish that includes one or more polymerizable reactants. The radiation-curable varnish is subsequently exposed to an electron-beam radiation source having an energy of less than about 100 keV in an amount sufficient to polymerize at least 90 weight % of the polymerizable reactants.

The packaged food product of the present invention possesses many of the appearance and abuse-resistance attributes of a food packaged in a trap-printed film; yet without the need to laminate a top film layer over the printed image of the packaging film to protect the printed image and provide enhanced gloss.

The advantages and features of the invention will be more readily understood and appreciated by reference to the detailed description of the invention.

DETAILED DESCRIPTION OF THE INVENTION

The packaged food product of the present invention includes a food product enclosed within a package comprising a coated, printed thermoplastic film. The coated, printed film includes a flexible substrate film on which an image is printed, the image being covered by a radiation-cured overprint varnish.

Substrate Film

A substrate film suitable for food packaging provides the structure upon which a printed image is applied. The substrate film may be monolayer, but preferably includes two or more layers (i.e., multilayered), so that the layers in combination impart the desired performance characteristics to the substrate film.

Each layer of the substrate film may include one or more thermoplastic materials. For example, the substrate film may include one or more layers comprising a polymer having mer units derived from ethylene, such as ethylene homopolymers and/or heteropolymers. Exemplary ethylene heteropolymers include those that include mer units derived from one or more of $C_3$–$C_{20}$ alpha-olefins, vinyl acetate, (meth)acrylic acid, and $C_1$–$C_{20}$ esters of (meth)acrylic acid. As used herein, "(meth)acrylic acid" means acrylic acid and/or methacrylic acid; and "(meth)acrylate" means an ester of (meth)acrylic acid.

Preferred heteropolymers include heterogeneous and homogeneous ethylene/alpha-olefin copolymers. As is known in the art, heterogeneous polymers have a relatively wide variation in molecular weight and composition distribution. Heterogenous polymers may be prepared with, for example, conventional Ziegler Natta catalysts. On the other hand, homogeneous polymers have relatively narrow molecular weight and composition distributions. Homogeneous polymers are typically prepared using metallocene or other single site-type catalysts. For a further discussion regarding homogenous polymers, see U.S. patent application Ser. No. 09/264,074 filed Mar. 8, 1999, now U.S. Pat. No. 6,528,127, by Edlein et al entitled "Method of Providing a Printed Thermoplastic film Having a Radiation-Cured Overprint Coating" (as amended), which is also owned by the assignee of this application and is incorporated herein in its entirety by reference.

Ethylene/α-olefin copolymers or heteropolymers include medium density polyethylene (MDPE), linear low density polyethylene (LLDPE), and very low and ultra low density polyethylene (VLDPE and ULDPE), which, in general, are prepared by the copolymerization of ethylene and one or more α-olefins. Preferably, the comonomer includes one or more $C_4$–$C_{20}$ α-olefins, more preferably one or more $C_4$–$C_{12}$ α-olefins, and most preferably one or more $C_4$–$C_8$ α-olefins. Particularly preferred α-olefins include 1-butene, 1-hexene, 1-octene, and mixtures thereof.

The substrate film may include one or more polyolefins in an amount (in ascending order of preference) of at least 20%, at least 40%, at least 50%, at least 60%, at least 65%, at least 70%, at least 75%, at least 80%, at least 85%, at least 90%, and at least 95% based on the weight of the total film.

Useful substrate films having high-temperature dimensional stability are disclosed in U.S. patent application Ser. No. 09/583,853 entitled "High Modulus, Multilayer Film" filed on May 31, 2000 by Hofmeister et al, now U.S. Pat. No. 6,379,812 which is also owned by the assignee of this application and is incorporated in its entirety herein by this reference.

Substrate Film Thickness

The substrate film may have any total thickness as long as it provides the desired properties (e.g., flexibility, Young's modulus, optics, seal strength) for a given packaging application of expected use. Preferred thicknesses for the substrate film include less than about (in ascending order of preference) 15 mils, 12 mils, 10 mils, 5 mils, 4 mils, and 3 mils. (A "mil" is equal to 0.001 inch.) Preferred thicknesses for the substrate film also include at least about (in ascending order of preference) 0.3 mils, 0.5 mils, 0.6 mils, 0.75 mils, 0.8 mils, 0.9 mils, 1 mil, 1.2 mil, 1.4 mil, and 1.5 mil.

Substrate Film Modulus

The substrate film preferably exhibits a Young's modulus sufficient to withstand the expected handling and use conditions. Young's modulus may be measured in accordance with one or more of the following ASTM proceedures: D882; D5026-95a; D4065-89, each of which is incorporated herein in its entirety by reference. Preferably, the substrate film has a Young's modulus of at least (in ascending order of preference) about 100 MPa, about 200 MPa, about 300 MPa, and about 400 MPa, measured at a temperature of 100° C. Preferred ranges for Young's modulus for the substrate film include (in ascending order of preference) from about 70 to about 1000 MPa, and from about 100 to 500, measured at a temperature of 100° C. A higher modulus film has an enhanced stiffness, which helps to reduce the tendency of a printed image or varnish on the substrate film to crack when the printed film is flexed. Further, it is helpful that the substrate film have a high modulus at the elevated temperatures present when the film is exposed to heat seal temperatures, for example, during a VFFS or lid stock sealing process.

Orientation, Heat Shrinkability

The substrate film may be oriented in either the machine (i.e., longitudinal) or the transverse direction, preferably in both directions (i.e., biaxially oriented), in order to reduce the permeability and to increase the strength and durability of the substrate film. Preferably, the substrate film is oriented in at least one direction by a ratio of (in ascending order of preference) at least 2.5:1, from about 2.7:1 to about 10:1, at least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

The substrate film may be heat shrinkable, having a total free shrink at 185° F. (85° C.) of at least about (in ascending order of preference) 5%, 10%, 15%, 40%, 50%, 55%, 60% and 65%. The total free shrink at 185° F. (85° C.) may also range (in ascending order of preference) from 40 to 150%, 50 to 140%, and 60 to 130%. The total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%. Although preferred, it is not required that the film have shrinkage in both directions. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference.

As is known in the art, a heat-shrinkable film shrinks upon the application of heat while the film is in an unrestrained state. If the film is restrained from shrinking—for example by a packaged good around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The substrate film may exhibit a shrink tension in at least one direction of (in ascending order of preference) at least 100 psi (689.6 kN/m2), 175 psi (1206.8 kN/m2), from about 175 to about 500 psi (1206.8 to 3448.0 kN/m2), from about 200 to about 500 psi (1379.2 to 3448.0 kN/m2), from about 225 to about 500 psi (1551.6 to 3448.0 kN/m2), from about 250 to about 500 psi (1724.0 to 3448.0 kN/m2), from about 275 to about 500 psi (1896.4 to 3448.0 kN/m2), from about 300 to about 500 psi (2068.8 to 3448.0 kN/m2), and from about 325 to about 500 psi (2241.2 to 3448.0 kN/m2). Shrink tension is measured at 185° F. (85° C.) in accordance with ASTM D 2838, which is incorporated herein in its entirety by reference.

The substrate film of the present invention may be annealed or heat-set to reduce the free shrink either slightly, substantially, or completely; however, it is preferred that the film not be heat set or annealed once stretched in order that the film will have a high level of heat shrinkability.

Optional Energy Treatment of the Substrate Film

One or more of the thermoplastic layers of the substrate film—or at least a portion of the entire substrate film—may be cross-linked to improve the strength of the substrate film, improve the orientation of the substrate film, and help to avoid bum through during heat seal operations. Cross-linking may be achieved by using chemical additives or by subjecting the substrate film layers to one or more energetic radiation treatments—such as ultraviolet, X-ray, gamma ray, beta ray, and high energy electron beam treatment—to induce cross-linking between molecules of the irradiated material. The film may be exposed to radiation dosages of at least 5, preferably at least 7, more preferably at least 10, most preferably at least 15 kGy (kiloGrey). The radiation dosage may also range from 5 to 150, more preferably from 5 to 100, and most preferably from 5 to 75 kGy.

All or a portion of the substrate film surface may be corona and/or plasma treated to change the surface energy of the substrate film, for example, to increase the ability of print or a food product to adhere to the substrate film. One type of oxidative surface treatment involves bringing the substrate film into the proximity of an $O_2$- or $N_2$-containing gas (e.g., ambient air) which has been ionized. Exemplary techniques are described in, for example, U.S. Pat. No.

4,120,716 (Bonet) and U.S. Pat. No. 4,879,430 (Hoffman), which are incorporated herein in their entirety by reference. The substrate film may be treated to have a surface energy of at least about 0.034 J/m$^2$, preferably at least about 0.036 J/m$^2$, more preferably at least about 0.038 J/m$^2$, and most preferably at least about 0.040 J/m$^2$.

Multiple Layer Substrate Film

The substrate film may include any number of layers, preferably a total of from 2 to 20 layers, more preferably at least 3 layers, even more preferably at least 4 layers, still more preferably at least 5 layers, and most preferably from 5 to 9 layers. A multilayered substrate film may include one or more of each of: i) a food-side or inside layer (i.e., heat seal layer), ii) a non-food or outside layer (i.e., print side layer), iii) a gas barrier layer, iv) a tie layer, v) an abuse layer, and vi) a bulk layer. Below are some examples of preferred combinations in which the alphabetical symbols designate the resin layers. Where the multilayer substrate film representation below includes the same letter more than once, each occurrence of the letter may represent the same composition or a different composition within the class that performs a similar function.

A/D, A/C/D, A/B/D, A/B/C/D, A/C/B/D, A/B/C/E/D, A/E/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B/D, A/C/B/B/D, A/C/B/C/B/D, A/C/E/B/B/D, A/B/E/C/E/B/D, A/B/E/C/E/B/E/D

A is the inside layer (heat seal layer), as discussed below.
B is a core or bulk layer, as discussed below.
C is a barrier layer, as discussed below.
D is an outside (print) layer, as discussed below.
E is a tie layer, as discussed below.

Heat Seal Layer

The substrate film may include one or more heat-seal layers—that is, a layer adapted to facilitate the heat-sealing of the film to itself or to another object, such as a tray. The heat-seal layer is typically an outside layer. Where fin seals are used, the substrate film need only include a heat-seal layer on the food-side (i.e., inside) of the multilayered substrate film. However, it is possible to include a heat-seal layer on the non-food side (i.e., outside) of the substrate film—in particular where the film is constructed in a balanced manner.

The heat seal layer may include one or more thermoplastic polymers including polyolefins (e.g., ethylene homopolymers, such as high density polyethylene ("HDPE") and low density polyethylene ("LDPE"), ethylene copolymers, such as ethylene/alpha-olefin copolymers ("EOAs"), propylene/ethylene copolymers, and ethylene/vinyl acetate copolymers), polyamides, polyesters, polyvinyl chlorides, and ionomers. The heat-seal layer preferably includes selected components so that the layer's softening point is lower than that of the other layers of the substrate film. The heat-seal layer may have a resin composition such that the heat seal layer has a Vicat softening temperature of at least (in ascending order of preference) 100° C., 110° C., and 120° C. All references to "Vicat" values in this application are measured according to ASTM 1525 (1 kg), which is incorporated herein in its entirety by reference.

Useful ethylene/alpha-olefin copolymers for the composition of the heat seal layer include one or more of MDPE, for example having a density of from 0.93 to 0.94 g/cm3; linear medium density polyethylene ("LMDPE"), for example having a density of from 0.926 to 0.94 g/cm3; LLDPE, for example having a density of from 0.920 to 0.930 g/cm3; VLDPE and ULDPE, for example having density below 0.915 g/cm3, and homogeneous ethylene/alpha-olefin copolymers, for example metallocene-catalyzed linear ethylene/alpha-olefin copolymers.

Particularly preferred copolymers for the heat seal layer include propylene/ethylene copolymers ("EPC"), which are copolymers of propylene and ethylene having an ethylene comonomer content of less than 10%, preferably less than 6%, and more preferably from about 2% to 6% by weight. The major component of the first outer layer may be blended with other components. For example, EPC as a major component of the first outer layer may be blended with polypropylene (PP), in which case the layer preferably includes between about 96% and 85% EPC and between about 4% and 15% PP, more preferably at least 92% EPC and less than 8% PP.

Other useful components for the heat seal layer include: i) copolymers of ethylene and vinyl acetate ("EVA") having vinyl acetate levels of from about 5 to 20 weight %, more preferably from about 8 to 12 weight %, and ii) (meth) acrylate polymers such as ethylene/(meth)acrylic acid ("EMAA"), ethylene/acrylic acid ("EAA"), ethylene/n-butyl acrylate ("EnBA"), and the salts of (meth)acrylic acid copolymers ("ionomers"). The heat seal layer may further include one or more of additives such as antiblock and antifog agents, or may be devoid of such agents.

The thickness of the heat seal layer is selected to provide sufficient material to effect a strong heat seal, yet not so thick so as to negatively affect the manufacture (i.e., extrusion) of the substrate film by lowering the melt strength of the film to an unacceptable level. The heat seal layer may have a thickness of from about 0.05 to about 6 mils (1.27 to 152.4 micrometer), more preferably from about 0.1 to about 4 mils (2.54 to 101.6 micrometer), and still more preferably from about 0.5 to about 4 mils (12.7 to 101.6 micrometer). Further, the thickness of the heat seal layer as a percentage of the total thickness of the substrate film may range (in ascending order of preference) from about 1 to about 50 percent, from about 5 to about 45 percent, from about 10 to about 45 percent, from about 15 to about 40 percent, from about 15 to about 35 percent, and from about 15 to about 30 percent.

Print Side Layer

The non-food or outside layer (i.e., print side layer) of the substrate film may be exposed to environmental stresses once the film is formed into a package. Such environmental stresses include abrasion and other abuse during processing and shipment. The outside layer preferably also provides heat-resistant characteristics to the film to help prevent "burn-through" during heat sealing. This is because in forming a package by conductance heat sealing the film to itself, the heat seal layer is placed in contact with itself, while the outside layer is proximate a heated jaw of a heat sealing apparatus. The heat seal jaw transfers heat through the outside layer to the heat seal layer of the package to soften the heat seal layer and form the heat seal.

Further, the outside layer of the substrate film provides the surface upon which the processor typically applies a printed image (e.g., printed information), such as by printing ink. As such, the outside layer is preferably capable of providing a surface that is compatible with selected print ink systems.

The print side layer may include one or more polyamides, polyethylene, and/or polypropylene either alone or in combination, for example, any one of these types of components in an amount of at least 50 weight %, more preferably at least 70%, still more preferably at least 90%, and most preferably 100% by weight of the layer. Where a printed image is formed on a polyamide-containing outside layer of the film—and a radiation-cured overprint varnish (discussed below) covers the printed image (e.g., an expoxy acrylate based radiation-curable overprint varnish), then the resulting coated, printed film is more capable of withstanding a heat seal jaw temperature of at least 250° F., more preferably at least 300° F., and most preferably at least 350° F., with no noticeable ink removal ("pick off") to the surface of the seal jaw. Suitable polyamides may include one or more of those identified in the "Other Layers" section below or in the previously incorporated U.S. patent application Ser. No. 09/583,853.

The outside layer may have a thickness of from about 0.05 to about 5 mils (1.27 to 127 micrometer), preferably from about 0.3 to about 4 mils (7.62 to 101.6 micrometer), and more preferably from about 0.5 to about 3.5 mils (12.7 to 88.9 micrometer). The thickness of the outside layer may range as a percentage of the total thickness of the substrate film of from about (in ascending order of preference) 1 to 50 percent, 3 to 45 percent, 5 to 40 percent, 7 to 35 percent, and 7 to 30 percent.

Barrier Layers

The substrate film may include one or more barrier layers between the inside and outside layers. A barrier layer reduces the transmission rate of one or more components—for example, gases or vapors or unreacted monomer—through the substrate film. Accordingly, the barrier layer of a film that is made into a package will help to exclude one or more components from the interior of the package—or conversely to maintain one or more gases or vapors within the package.

As used herein, "unreacted-monomer barrier layer" is a substrate film layer that has a thickness and composition sufficient to impart to the substrate film as a whole enhanced resistance to migration of unreacted monomer, unpolymerized material, reaction by-products or secondary products, and/or other migratable components of the varnish/ink (or derived from the varnish/ink) from a printed image or overprint varnish layer on the outside of the substrate film. Specifically, such barrier layer enhances the substrate film such that it is capable of precluding more than 50 ppb of unreacted monomer from migrating through the substrate film, when tested according to the FDA migration test protocol (discussed above) under the following conditions: 10 days at 40° C. film exposure to one or more food simulants of: i) 95 weight % ethanol and 5 weight % water or ii) 5 weight % ethanol and 95 weight % water enclosed within a test container formed from the coated, printed film so that the food simulant contacts the food side of the substrate film and the ratio of volume of food simulant to surface area of coated, printed film is 10 milliliters per square inch.

The unreacted-monomer barrier layer may include one or more of the following polymers: polyvinyl alcohol, acrylonitrile-butadiene copolymer, isobutylene-isoprene copolymer, polyacrylonitrile, polyvinylidene chloride, highly crystalline polyamide, highly crystalline polypropylene, and highly crystalline polyethylene. Suitable polyamides may include one or more of those identified in the "Other Layers" section below. The term "highly crystalline" has a meaning generally understood to those of skill in the art. Crystallinity depends on how the film is produced—generally a film cooled slowly will have a higher crystallinity than one that is rapidly quenched. Further, a maximum amount of crystallinity exists for polyamides, polypropylenes and polyethylenes that is achieved using the most advantageous time/temperature path for cooling. A component may be considered "highly crystalline" herein if the amount of crystalline molecules is at least 70 weight percent of the maximum amount of crystallinity.

A gas barrier layer preferably has a thickness and composition sufficient to impart to the substrate film an oxygen transmission rate of no more than (in ascending order of preference) 500, 150, 100, 50, 20, 15, and 10 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985, which is incorporated herein in its entirety by reference.

Oxygen (i.e., gaseous $O_2$) barrier layers may include one or more of the following polymers: ethylene/vinyl alcohol copolymer ("EVOH"), vinylidene chloride copolymers ("PVDC"), polyalkylene carbonate, polyester (e.g., PET, PEN), polyacrylonitrile, and polyamide. EVOH may have an ethylene content of between about 20% and 40%, preferably between about 25% and 35%, more preferably about 32% by weight. EVOH includes saponified or hydrolyzed ethylene/vinyl acetate copolymers, such as those having a degree of hydrolysis of at least 50%, preferably of at least 85%. A barrier layer that includes PVDC may also include a thermal stabilizer (e.g., a hydrogen chloride scavenger such as epoxidized soybean oil) and a lubricating processing aid (e.g., one or more acrylates). PVDC includes crystalline copolymers, containing vinylidene chloride and one or more other monomers, including for example vinyl chloride, acrylonitrile, vinyl acetate, methyl acrylate, ethyl acrylate, ethyl methacrylate and methyl methacrylate.

A gas barrier layer may also be formed from a latex emulsion coating grade of vinylidene chloride/vinyl chloride copolymer having 5–15% vinyl chloride. The coating grade copolymer of vinylidene chloride/vinyl chloride may be present in an amount of from 5–100% (of total solids) with the remainder being 2–10% epoxy resin and melt extrusion grade material.

The barrier layer thickness may range from about (in order of ascending preference) 0.05 to 6 mils (1.27 to 152.4 micrometer), 0.05 to 4 mils (1.27 to 101.6 micrometer 0.1 to 3 mils (2.54 to 76.2 micrometer), and 0.12 to 2 mils (3.05 to 50.8 micrometer).

Tie Layers

The substrate film may include one or more tie layers, which have the primary purpose of improving the adherence of two layers to each other. Tie layers may include polymers having grafted polar groups so that the polymer is capable of covalently bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Preferred polymers for tie layers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

The substrate film may include a tie layer directly adhered (i.e., directly adjacent) to one or both sides of an internal gas barrier layer. Further, a tie layer may be directly adhered to the internal surface of the outside layer (i.e., an abuse layer). The tie layers are of a sufficient thickness to provide the adherence function, as is known in the art. Each tie layer may be of a substantially similar or a different composition and/or thickness.

Other Layers

The substrate film may also include one or more layers to serve as other types of inner or outer layers, such as core, bulk, and/or abuse layers. Such a layer may include one or more polymers that include mer units derived from at least one of a $C_2$–$C_{12}$ α-olefin, styrene, amides, esters, and urethanes. Preferred among these are those homo- and heteropolymers that include mer units derived from ethylene, propylene, and 1-butene, even more preferably an ethylene heteropolymer such as, for example, ethylene/$C_3$–$C_8$ α-olefin heteropolymer, ethylene/ethylenically unsaturated ester heteropolymer (e.g., ethylene/butyl acrylate copolymer), ethylene/ethylenically unsaturated acid heteropolymer (e.g., ethylene/(meth)acrylic acid copolymer), and ethylene/vinyl acetate heteropolymer. Preferred ethylene/vinyl acetate heteropolymers are those that include from about 2.5 to about 27.5 weight %, preferably from about 5 to about 20%, even more preferably from about 5 to about 17.5% mer units derived from vinyl acetate. Such a polymer preferably has a melt index of from about 0.3 to about 25, more preferably from about 0.5 to about 15, still more preferably from about 0.7 to about 5, and most preferably from about 1 to about 3.

The substrate film may include a layer derived at least in part from a polyester and/or a polyamide. Examples of suitable polyesters include amorphous (co)polyesters, poly (ethylene/terephthalic acid), and poly(ethylene/naphthalate), although poly(ethylene/terephthalic acid) with at least about 75 mole percent, more preferably at least about 80 mole percent, of its mer units derived from terephthalic acid may be preferred for certain applications. Examples of suitable polyamides include polyamide 6, polyamide 9, polyamide 10, polyamide 11, polyamide 12, polyamide 66, polyamide 610, polyamide 612, polyamide 6I, polyamide 6T, polyamide 69, heteropolymers made from any of the monomers used to make two or more of the foregoing homopolymers, and blends of any of the foregoing homo- and/or heteropolymers.

Additives

One or more layers of the substrate film may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

Manufacture of the Substrate Film

The substrate film may be manufactured by a variety of processes known in the art, including extrusion (e.g., blown-film extrusion, coextrusion, extrusion coating, free film extrusion, and lamination), casting, and adhesive lamination. A combination of these processes may also be employed. These processes are well-known to those of skill in the art. For example, extrusion coating is described in U.S. Pat. No. 4,278,738 to Brax, which is incorporated herein in its entirety by reference. Coextrusion manufacture may use, for example, a tubular trapped bubble film process or a flat film (i.e., cast film or slit die) process.

Printed Image

A printed image is applied to the substrate film, preferably to the non-food side of the film. To form the printed image, one or more layers of ink are printed on the film. If the film is multilayered, the ink is preferably applied to the outside layer of the substrate film. The ink is selected to have acceptable ink adhesion, gloss, and heat resistance once printed on the film substrate. Acceptable ink adhesions include (in ascending order of preference) at least 50%, at least 60%, at least 70%, at least 80%, at least 90%, and at least 95%, as measured by ASTM D3359-93, as adapted by those of skill in the film print art. The ink system may be radiation curable or solvent-based. These types of ink systems are known in the art.

Solvent-based inks for use in printing packaging films include a colorant (e.g., pigment) dispersed in a vehicle that typically incorporates a resin (e.g., nitrocellulose, polyamide), a solvent (e.g., an alcohol), and optional additives. Inks and processes for printing on plastic films are known to those of skill in the art. See, for example, Leach & Pierce, The Printing Ink Manual, ($5^{th}$ ed., Kluwer Academic Publishers, 1993) and U.S. Pat. No. 5,407,708 to Lovin et al., each of which is incorporated herein in its entirety by reference.

Examples of solvent-based ink resins include those which have nitrocellulose, amide, urethane, epoxide, acrylate, and/or ester functionalities. Ink resins include one or more of nitrocellulose, polyamide, polyurethane, ethyl cellulose, (meth)acrylates, poly(vinyl butyral), poly(vinyl acetate), poly(vinyl chloride), and polyethylene terephthalate (PET). Ink resins may be blended, for example, as nitrocellulose/polyamide blends (NC/PA) or nitrocellulose/polyurethane blends (NC/PU).

Examples of ink solvents include one or more of water solvent or hydrocarbon solvent, such as alcohols (e.g., ethanol, 1-propanol, isopropanol), acetates (e.g., n-propyl acetate), aliphatic hydrocarbons, aromatic hydrocarbons (e.g., toluene), and ketones. The solvent may be incorporated in an amount sufficient to provide inks having viscosities, as measured on a #2 Zahn cup as known in the art, of at least about 15 seconds, preferably of at least about 20 seconds, more preferably of at least about 25 seconds, even more preferably of from about 25 to about 45 seconds, and most preferably from about 25 to about 35 seconds.

The substrate film may be printed by any suitable method, such as rotary screen, gravure, or flexographic techniques, as is known in the art. Once a solvent-based ink is applied to the substrate film, the solvent evaporates, leaving behind the resin-pigment combination. The solvent may evaporate as a result of heat or forced air exposure to speed drying. The ink may be applied in layers, each with a different color, to provide the desired effect. For example, a printing system may employ eight print stations, each station with a different color ink. Optionally, the last (e.g., eighth) print station may be used to apply an overprint varnish (discussed below).

A radiation-curable ink system may incorporate one or more colorants (e.g., pigments) with the monomers and oligomer/prepolymers as discussed below with respect to the radiation-curable overprint varnish. Application and curing of a radiation-curable ink is similar to that as discussed in that section. Preferably, each of the inks used to make the printed markings on the substrate film surface are essentially free of photoinitiators, thus eliminating the possibility that such materials may migrate toward and into the product to be packaged.

To improve the adhesion of the ink to the surface of the substrate film, the surface of the substrate film may be treated or modified before printing. Surface treatments and modifications include: i) mechanical treatments, such as corona treatment, plasma treatment, and flame treatment, and ii) primer treatment. Surface treatments and modifications are known to those of skill in the art. The flame treatment is less desirable for a heat-shrinkable film, since heat may prematurely shrink the film. The primer may be based on any of the ink resins previously discussed, preferably an ethylene vinyl acetate polymer (EVA) resin. The ink on the printed film should withstand without diminished performance the temperature ranges to which it will be exposed during packaging and use. For example, the ink on the printed film preferably withstands physical and thermal abuse (e.g., heat sealing) during packaging end-use, such as at temperatures of (in ascending order of preference) 100° C., 125° C., 150° C., and 175° C. for 3 seconds, more preferably 5 seconds, and most preferably 8 seconds.

Radiation-Curable Overprint Varnish

An overprint varnish (i.e., overcoat) may be applied to the printed side of the printed substrate film to cover at least the printed image of the printed substrate film. Preferably, the overprint varnish covers a substantial portion of the printed image—that is, covering a sufficient portion of the printed image to provide the desired performance enhancements. Preferably, the overprint varnish is transparent.

The overprint varnish is preferably formed or derived from a radiation-curable (i.e., radiation-polymerizable) overprint varnish system. Such a system has the ability to change from a fluid phase to a highly cross-linked or polymerized solid phase by means of a chemical reaction initiated by a radiation energy source, such as ultra-violet ("UV") light or electron beam ("EB") radiation. Thus, the reactants of the radiation-curable overprint varnish system are "cured" by forming new chemical bonds under the influence of radiation. Radiation-curable inks and varnish systems are described in The Printing Ink Manual, Chapter 11, pp. 636–77 ($5^{th}$ ed., Kluwer Academic Publishers, 1993), of which pages 636–77 are incorporated in their entirety by reference.

The radiation-cured overprint varnish provides a protective covering having good flexibility without cracking; yet, since the radiation-cured overprint varnish is cross-linked after irradiation, the varnish resin is less likely to flow when exposed to heat during a heat seal operation. Further, the radiation-cured overprint varnish improves the abrasion resistance and gloss of the coated, printed substrate. The gloss is improved because radiation-cured overprint varnish systems are found to produce a smoother, more contiguous coating in comparison to solvent-based overprint varnish systems.

Radiation-curable overprint varnish systems or formulations include: i) monomers (e.g., low-viscosity monomers or reactive "diluents"), ii) oligomers/prepolymers (e.g., acrylates), and optionally iii) other additives, such as non-reactive plasticizing diluents. Radiation-curable overprint varnish systems that are cured by UV light also include one or more photoinitiators. Radiation-curable overprint varnish systems curable by EB radiation do not require a photoinitiator, and may therefore be free of photoinitiator. Together, the monomers and oligomers/prepolymers may be grouped as "reactants."

One or more of each of the reactive diluents/monomers and oligomers/prepolymers in a pre-cured overprint varnish formulation may have (in ascending order of preference) at least one, at least two, from two to ten, from two to five, and from two to three units of unsaturation per molecule. As is known in the art, one unit of unsaturation per molecule is known as monofunctional; two units of unsaturation per molecule is known as difunctional; and so on. Two or more terminal polymerizable ethylenically unsaturated groups per molecule are preferred.

Exemplary reactive diluents include (meth)acrylate diluents, such as trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, propylene glycol mono/dimethacrylate, trimethylolpropane diacrylate, di-trimethylolpropane tetraacrylate, triacrylate of tris (hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, aminoplast (meth)acrylates; acrylated oils such as linseed, soya, and castor oils. Other useful polymerizable compounds include (meth)acrylamides, maleimides, vinyl acetate, vinyl caprolactam, polythiols, vinyl ethers, and the like.

Useful oligomers/prepolymers include resins having acrylate functionality, such as epoxy acrylates, polyurethane acrylates, and polyester acrylates, with epoxy acrylates preferred. Exemplary oligomers and prepolymers include (meth)acrylated epoxies, (meth)acrylated polyesters, (meth) acrylated urethanes/polyurethanes, (meth)acrylated polyethers, (meth)acrylated polybutadiene, aromatic acid (meth)acrylates, (meth)acrylated acrylic oligomers, and the like.

If the radiation-curable overprint varnish is formulated for curing by exposure to UV-light, then the overprint varnish includes one or more photoinitiators. Useful photoinitiators include the benzoin alkyl ethers, such as benzoin methyl ether, benzoin ethyl ether, benzoin isopropyl ether and benzoin isobutyl ether. Another useful class of photoinitiators include the dialkoxyacetophenones, exemplified by 2,2-dimethoxy-2-phenylacetophenone (i.e., Irgacure®651 by Ciba-Geigy) and 2,2-diethoxy-2-phenylacetophenone. Still another class of useful photoinitiators include the aldehyde and ketone carbonyl compounds having at least one aromatic nucleus attached directly to the carboxyl group. These photoinitiators include, but are not limited to benzophenone, acetophenone, o-methoxybenzophenone, acetonaphthalenequinone, methyl ethyl ketone, valerophenone, hexanophenone, alpha-phenyl-butyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthene-9-one, 7-H-benz[de]-anthracen-7-one, 1-naphthaldehyde, 4,4'-bis(dimethylamino)-benzophenone, fluorene-9-one, 1'-acetonaphthone, 2'-acetonaphthone, 2,3-butedione, acetonaphthene, and benz[a]anthracene 7.12 diene. Phosphines such as triphenylphosphine and tri-o-tolylphosphine are also useful as photoinitiators.

Preferred photoinitiators have low volatility, do not noticeably discolor the cured varnish, and do not produce undesirable by-products in the cured varnish that could migrate through the substrate. Specific examples include Irgacure® 2959 and Irgacure® 819, both from Ciba Speciality Chemicals, and Esacure® KIP 150, supplied by Sartomer Company. It is also well known to those skilled in the art that the use of synergists/co-initiators may improve photocure and may optionally be used. The preferred synergists/co-initiators would not noticeably discolor the cured varnish, or produce undesirable by-products in the cured varnish that could migrate through the substrate. Specific examples include Ebecryl® P104, Ebecryl® P115 and Ebecryl® 7100, all supplied by UCB chemicals Corp.

The radiation-curable overprint varnish formulation may optionally include small amounts (e.g., from 0.05 to 15 weight %) of polymerization inhibitors, processing aids, slip aids, flowout aids, antiblock agents, plasticizers, adhesion promotors, and other additives or components, such as those FDA-approved for food contact (direct or indirect), for example, as recited in the U.S. Code of Federal Regulations, 21 C.F.R. Section 175.300, which is incorporated herein in its entirety by reference. Such additives themselves preferably are reactive in that they polymerize and/or crosslink upon exposure to ionizing radiation, so as to become incorporated into the polymer matrix of the overcoat—or are of a high enough molecular weight so that the chance of migration into or toward the substrate film is reduced or eliminated. Preferred materials include those that contain (meth)acrylate functionalities. However, the radiation-curable overprint varnish may optionally include from 0.05 to 50 weight % non-reactant polymer soluble in the radiation-curable overprint varnish.

Preferably, the radiation-curable overprint varnish system is one that relies upon a free-radical mechanism to initiate and propagate the cure reaction (i.e., a free-radical radiation-curable overprint varnish). However, there are available radiation-curable cationic overprint systems, which use UV-light to initiate the reaction; but do not rely upon a free-radical mechanism. Accordingly, the reaction may continue even if no additional UV-light is provided. However, radiation-curable cationic overprint systems may suffer cure inhibition from the moisture in air, the components of inks (e.g. pigments, fillers, some resins, printing additives), and additives in the substrate film that are alkaline in nature. The sensitivity to alkaline materials is such that even trace amounts of contaminants that are typically found in a production setting may inhibit and/or prevent the cure. Further, cationic cure systems are not typically curable using EB radiation within useful dose ranges unless there is a initiator present such as that used in photocuring. Accordingly, the radiation-curable overprint varnish preferably excludes a radiation-curable cationic overprint varnish.

Useful radiation-curable overprint varnish systems are commercially available. For example, an EB curable overprint varnish is available from Rohm & Haas (previously Morton International, Inc.'s Adhesives & Chemical Specialties) under the MOR-QUIK 477 trademark. It has a density of about 9.05 lb./gal at 25° C., a refractive index of 1.484, an acid number of 0.5 mg KOH/g, and a viscosity at 25° C. of 100 cps. It contains multifunctional acrylic monomer and acrylated epoxy oligomer. It is believed to be substantially free of monofunctional monomer. Less preferred form Rohm & Haas is MOR-QUIK 444HP, which is believed to include substantially more acrylic monomer than (i.e., about twice as much as) the MOR-QUIK 477 overprint varnish.

A useful EB curable overprint varnish is also available from Sun Chemical under the product code GAIFBO440206; it is believed to be essentially free of monomer/reactive diluent and contains a small amount (less than 15 weight %) water as diluent. It has a viscosity of about 200 cP at 25° C., a density of 8.9 lbs/gal, and boiling point of 212° F.

Other radiation-curable overprint varnishes include that from Rohm & Haas under the MOR-QUIK 333; from Pierce and Stevens under the L9019, L9024, and L9029 product codes; from Cork Industries, Inc. under the CORKURE 119 HG, CORKURE 2053HG, CORKURE 601HG; from Environmental Inks and Coatings under the UF-170066 product code; and from Rad-Cure Corporation under the RAD-KOTE 115, RAD-KOTE K261, RAD-KOTE 112S, RAD-KOTE 708HS, and RAD-KOTE 709 trademarks.

Concentrations

Useful concentrations of the reactants for a radiation-curable overprint varnish system vary from about 0 to about 95 weight % monomer and from about 95 to about 5 weight % oligomer/prepolymer. When copolymerizable components are included in the compositions, the amounts used depend on the total amount of ethylenically unsaturated component present; for example, in the case of polythiols, from 1 to 98% of the stoichiometric amount (based on the ethylenically unsaturated component) may be used.

More particularly, the radiation-curable overprint varnish system may include reactive monomer in an amount ranging from (in ascending order of preference) about 0 to about 60%, about 10 to about 50%, about 15 to about 40%, and about 15 to about 30%, based on the weight of the pre-reacted overprint varnish formulation. The oligomer/prepolymer may be present in amounts ranging from (in ascending order of preference) about 5 to about 90%, about 10 to about 75%, about 15 to about 50%, and about 15 to about 30%, also based on the weight of the pre-reacted overprint varnish formulation.

Useful overprint varnish formulations include (in ascending order of preference) less than 20%, less than 10%, less than 5%, less than 1%, and essentially free of monofunctional monomer, based on the weight of pre-reacted overprint varnish formulation. Useful overprint varnish formulation may also include (in ascending order of preference) less than 20%, less than 10%, less than 5%, less than 1%, and essentially free of monofunctional oligomer, based on the weight of pre-reacted overprint varnish formulation.

A UV-curable overprint varnish formulation may be similar to an electron beam formulation, except including photoinitiator. The preferred amount of photoinitiator present in a UV-curable system is the minimal amount sufficient to facilitate the polymerization reaction, since residual photoinitiator may remain in the overprint varnish to potentially migrate through the substrate film. Useful concentrations of photoinitiator include from about 0.5 to about 5%, more preferably from about 1 to about 3%, based on the weight of the pre-reacted overprint varnish system.

Viscosity

The desired viscosity for the pre-reacted overprint varnish depends in part on the coating application method to be used. The pre-reacted overprint varnish preferably has a viscosity such that it may be printed or applied in a similar manner as solvent-based inks. Typical viscosity application ranges include (in ascending order of preference) from about 20 to about 4,000, from about 50 to about 1,000, from about 75 to about 500, and from about 100 to about 300 centipoise (cP) measured at 25° C. The pre-reacted overprint varnish may be heated in order to achieve the desired viscosity range; however, the temperature of the varnish preferably is maintained below that which will negatively affect the overprint varnish or heat the substrate film to an undesirable level—that is, a temperature that will deform or shrink the substrate film.

Application and Curing of the Overprint Varnish

The pre-reacted (i.e., radiation-curable) overprint varnish may be applied to the printed film using the same techniques as described previously with respect to the application of ink to form the printed image. Exemplary techniques include screen, gravure, flexographic, roll, and metering rod coating processes. Although application of the overcoat may occur separate in time and/or location from application of the printed image, it preferably occurs in-line with application of the ink that forms the printed image. For example, the overprint varnish may be applied to the printed image using the last stage of a multi-stage flexographic printing system.

After application of the pre-reacted overprint varnish to the printed film, the film is exposed to radiation to complete the coated, printed film. This polymerizes and/or crosslinks the reactants in the overcoat, thus providing a hardened "shell" over the underlying printed image. An electron beam is the preferred form of radiation, although UV-light radiation may be used if the overprint varnish is formulated with photoinitiator. The radiation source for an EB system is known as an EB generator.

Two factors are important in considering the application of EB radiation: the dose delivered and the beam penetration. The dose is measured in terms of quantity of energy absorbed per unit mass of irradiated material; units of measure in general use are the megarad (Mrad) and kiloGrey (kGy). The depth of penetration by an electron beam is directly proportional to the energy of the accelerated electrons impinging on the exposed material (expressed as kiloelectron volts, keV).

Regardless of the radiation source, the radiation dose is preferably sufficient to polymerize the reactants such that at least about (in ascending order of preference) 80%, 90%, 92%, 94%, 96%, 98%, 99%, and 100% of the reactive sites on the reactants polymerize and/or cross-link.

Preferably, however, the dosage and penetration are not so high so as to degrade the underlying printed image or substrate film. Useful radiation dosages range (in ascending order of preference) from about 0.2 to about 10 Mrads, from about 0.5 to about 9 Mrads, from about 0.8 to about 8 Mrads, from about 1 to about 7 Mrads, from about 1 to about 7 Mrads, from about 1 to about 6 Mrads, from about 1.2 to about 5 Mrads, from about 1.5 to about 4.5 Mrads, from about 1.8 to about 4 Mrads, from about 2 to about 3.0 Mrads. Useful energies for the EB range (in ascending order of preference) from about 30 to about 250 keV, from about 150 to 250 keV, from about 100 to 150 keV, from about 70 to about 100 keV, from about 50 to about 70 keV, from about about 40 to about 50 keV, and from about 30 to about 40 keV. Preferably, the electron energy is less than (in ascending order of preference) about 250 keV, about 150 keV, about 100 keV, about 70 keV, about 60 keV, about 50 keV, and about 40 keV.

Irradiating the EB-curable overprint varnish with electrons having an energy of less than about (in ascending order of preference) 150 keV, 100 keV, 80 keV, 70 keV, 60 keV, and 50 keV enhances the abrasion and solvent-rub resistance of the coated, printed film. It is believed that these lower energies increase the cross-linking within the overprint varnish. Further, the use of EB radiation with an energy of less than about 70 keV penetrates the coated, printed film less deeply than higher-voltage EB—and is therefore less likely to degrade the substrate film, as discussed above. For example, an EB-cured overprint varnish printed film cured at 50 keV had 70% less ink removal than equivalent samples cured at 200 keV. The lower-energy cured coated, printed films also had better solvent rub resistance (e.g., surviving better than 300 double rubs under the NPAC rub test discussed below, compared to less than 50 double rubs for the equivalent sample cured at 200 keV).

Useful EB generation units include those commercially available from American International Technologies sold under the trademark MINI-EB (these units have tube operating voltages from about 30 to 70 kV) and from Energy Sciences, Inc. sold under the trademark EZ CURE (these units have operating voltages from about 70 to about 110 kV). EB generation units typically require adequate shielding, vacuum, and inert gassing, as is known in the art. If the processing techniques employed allow for the use of a low oxygen environment, the coating and irradiation steps preferably occur in such an atmosphere. A standard nitrogen flush can be used to achieve such an atmosphere. The oxygen content of the coating environment preferably is no greater than about 300 ppm, more preferably no greater than about 200 ppm, even more preferably no greater than about 100 ppm, still more preferably no greater than about 50 ppm, and most preferably no greater than about 25 ppm with a completely oxygen-free environment being the ideal.

Overprint Varnish Thickness

The radiation-curable overprint varnish is applied in a thickness that once cured is effective to provide the desired performance enhancement, for example, to enhance gloss, heat resistance, abrasion resistance (during film handling and processing) and/or chemical resistance (e.g., to fatty acids, oils, processing aids). However, the cured overprint varnish thickness should be thin enough not to crack upon flexing or to restrict the substrate film from shrinking or flexing as required by the desired application. Useful radiation-cured overprint varnish thicknesses include (in ascending order of preference) from about 0.1 to about 12 μm, from about 0.5 to about 10 μm, from about 1.0 to about 8 μm, from about 1.5 to about 5 μm, and from about 1.5 to about 2.5 μm.

Appearance and Performance Characteristics

The coated, printed thermoplastic film of the present invention preferably has low haze characteristics. Haze is a measurement of the transmitted light scattered more than 2.5° from the axis of the incident light. Haze is measured against the outside (i.e., overprint coated side) of the coated, printed film, according to the method of ASTM D 1003, which is incorporated herein in its entirety by reference. All references to "haze" values in this application are by this standard. Preferably, the haze is no more than about (in ascending order of preference) 20%, 15%, 10%, 9%, 8%, 7%, and 6%.

The coated, printed film preferably has a gloss, as measured against the outside (overprint varnish side) of at least about (in ascending order of preference) 40%, 50%, 60%, 63%, 65%, 70%, 75%, 80%, 85%, 90%, and 95%. All references to "gloss" values in this application are in accordance with ASTM D 2457 (60° angle), which is incorporated herein in its entirety by reference. It has been found that increasing thicknesses of cured radiation-curable overprint varnish tends to increase the gloss of the coated, printed film. For example, an overprint varnish of at least 0.5 micrometers may provide a gloss of at least 75%; and an overprint varnish of at least 1.8 micrometers may provide a gloss of at least 90%.

Preferably, the coated, printed film is transparent (at least in the non-printed regions) so that a packaged food item is visible through the film. "Transparent" as used herein means that the material transmits incident light with negligible scattering and little absorption, enabling objects (e.g., packaged food or print) to be seen clearly through the material under typical viewing conditions (i.e., the expected use conditions of the material).

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173–80 (July 1993), of which pages 173–80 is incorporated herein by reference.

The coated, printed film once formed into a package (as discussed below) should be able to withstand normal packing, distribution, and handling with minimal ink loss from the coated, printed film. Preferably, the coated, printed film is capable of being flexed or shrunk without cracking or degrading the radiation-cured overprint varnish—or distorting or removing the underlying printed image. One test of this capacity is the "crinkle test." The crinkle test is performed by the following steps: 1) grasping the coated, printed film between thumb and forefinger of both hands with a distance of from 1 to 1½ inches between thumbs with the print side facing up, 2) bringing the thumbs together to create a creased surface in the film with ink to ink, 3) rotating the right thumb five revolutions rapidly with pressure against the right side of the left thumb in a scrubbing motion, 4) stretching the film back to the original flatness, and 5) rating the appearance of the surface by assigning a crinkle test rating of from 1 to 5 based on the resulting appearance of the tested film. A crinkle test rating of 5 means no apparent printed image removal or distortion; a rating of 1 means the printed image is totally distorted or removed. The crinkle test ratings of 2, 3, and 4 are equally spaced between the ratings of 1 and 5. For example, a crinkle test rating of 4 means that the tested film has an appearance such that about 10 weight percent of the printed image is distorted or removed. Preferably, the coated, printed film has a crinkle test rating of 4 or more, more preferably 5.

The abrasion resistance of the coated, printed film may also be measured using a TMI Model 10-18-01-001 rub tester available from Testing Machines Inc. (Amityville, N.Y.) using a 4 pound sled, which accepts an about 2 inch by 4 inch green A-4 Gavarti receptor available from Gavarti Associates Ltd. (Milwaukee, Wis.). The coated, printed side of the film is tested for 100 cycles at a rate of 100 cycles per minute. The ink loss to the receptor is measured by scanning the sample and recording the number of pixels of ink removed. Preferably, the coated, printed film loses no more than about (in ascending order of preference) 200,000 pixels, 100,000 pixels, 75,000 pixels, 50,000 pixels, 40,000 pixels, and 20,000 pixels.

The solvent resistance of the coated, printed film may be tested by soaking a standard cotton swab in solvent (n-propyl acetate). The coated side of the film is double rubbed with the soaked cotton swab until a "break" (distortion or smear) in the printed image is apparent. The number of double rubs required for break is recorded. This "NPAC Rub" test may indicate the sufficiency of crosslinking in the coating and/or ink. Preferably, the coated, printed film withstands at least (in ascending order of preference) 50, 100, 150, and 200 double rubs without break in the printed image.

Food Packages

The coated, printed thermoplastic film may be formed into a package suitable for enclosing a food product. Examples of suitable packages include VFFS packages, HFFS packages, lidded trays or cups that use the coated, printed thermoplastic film as the lidding material, as well as any pouches, bags, or other like packages formed by heat sealing the coated, printed film to form the package.

To form a food package, one or more selected regions of the inside (i.e., heat seal layer side) of the film may be sealed, as is known in the art. Useful package configurations include end-seal bag, a side-seal bag, an L-seal bag (e.g., sealed across the bottom and along one side with an open top), or a pouch (e.g., sealed on three sides with an open top). Such bag configurations are known to those of skill in the art. See, for example, U.S. Pat. No. 5,846,620 issued Dec. 8, 1998 to Compton, which is incorporated herein in its entirety by reference. Additionally, lap seals may be employed, in which the inside region of the film is heat sealed to an outside region of the film.

After forming a bag, a product such as a food product may be introduced into the package, and any opening of the package may be sealed. The coated, printed film may be used to package a variety of products, although it is preferably used to package a food product or substance. Suitable food products include fatty foods (e.g., meat products, cheese products), aqueous foods (e.g., produce and some soups), and dry food (e.g., cereal, pasta). Examples of meat products that may be packaged include, poultry (e.g., turkey or chicken breast), bologna, braunschweiger, beef, pork, lamb, fish, and whole muscle products such as roast beef, and other red meat products. Examples of produce or vegetables that may be packaged include cut and uncut lettuce, carrots, radish, and celery. The food product may be solid, solid particles, dry, fluid, or a combination thereof.

The coated, printed film may also be wrapped around a product and heat sealed to form a package enclosing the product. If the coated, printed film is formed of a heat-shrinkable film, the resulting bag may be heated to shrink the film around the product. Where the product being packaged is a food product, it may be cooked by subjecting the entire bag or package to an elevated temperature for a time sufficient to effectuate the degree of cooking desired.

The coated, printed film may also be used as a transparent wrap to cover and secure a food product that rests on a tray—that is, the film may be used as a tray overwrap. The coated, printed film may be adapted for use as a complete tray overwrap—namely, where the film is capable of completely covering the packaged food product and adhering or clinging to itself to complete the packaging closure. Further, the coated, printed film may be adapted for use as a lid-seal overwrap, in which case the film is adapted for adhering, sealing, or clinging to the tray to complete the packaging closure.

The areas or regions of the coated, printed film that are exposed to heat in order to form a heat seal (either film-to-film or film-to-container) are the "heat seal regions" of the film. Preferably, at least a portion of the radiation-cured overprint varnish extends into the heat seal regions.

A common heat seal method uses a heat seal jaw at an elevated temperature to both apply pressure and heat the film being heat sealed above the heat seal initiation temperature. Because of the selected package seal configuration, the heat seal jaw typically contacts the outside (i.e., coated, print side) of the film. Preferably, the radiation-cured overprint varnish is capable of withstanding the elevated temperature associated with the heat seal process without having a portion of the overprint varnish softening to the point so that it sticks to the heat seal jaw or otherwise "picks off" of the coated, printed film. As such, the weight of overprint varnish per unit area of substrate film in the heat-sealed region is preferably at least substantially equal to the weight of overprint varnish per unit area of substrate film outside of the heat-sealed region.

Further, the radiation-cured overprint varnish enhances the protection of the underlying printed image during the heat seal process so that a portion of the printed image does not stick to the heat seal jaw or otherwise "pick off" of the coated, printed film. As such, the weight of printed image per unit area of substrate film in the heat-sealed region is preferably at least substantially equal to the weight of printed image per unit area of substrate film outside of the heat-sealed region.

A printed film's resistance to pick off may be measured by contacting the overprint varnish or print side of a printed film with an aluminum foil for 2 seconds under a contact pressure of 60 psig at a temperature of (in increasing order of preference) about 250° F., about 300° F., and about 350° F. The amount of weight loss of the printed film being tested is then measured. Under this test, the coated, printed film transfers less than about (in ascending order of preference) 20%, 15%, 10%, 5%, and 1% of the weight of the printed image to the foil. In other words, the coated, printed film retains at least about (in ascending order of preference) 80%, 85%, 90%, 95%, and 99% of its printed image after being exposed to the heat seal process for forming the bag, preferably even after being subjected to elevated temperatures, such as 70° C. for an hour.

The radiation-cured overprint varnish may also provide a gloss that resists degradation after exposure to the heat, pressure, and abuse associated with the heat seal process. As such, the gloss of the coated, printed film in the heat-sealed regions is preferably at least substantially equal to the gloss of the coated, printed film outside of the heat-sealed regions.

The packaged food product may be made by: 1) forming a substrate film, 2) applying a printed image on at least one side of the substrate film to form a printed film, 3) coating at least the printed image of the printed film with a radiation-curable overprint varnish, 4) curing the radiation-curable overprint varnish to form a coated, printed film, 5) forming a package comprising at least the coated, printed film, 6) placing a food product within the package, and 7) sealing the package to enclose the food product.

The following examples are presented for the purpose of further illustrating and explaining the present invention and are not to be taken as limiting in any regard. Unless otherwise indicated, all parts and percentages are by weight.

EXAMPLE 1 (SUBSTRATE FILM)

The following eight-layer substrate film was made using the coextrusion method. The film had good toughness, puncture resistance, high seal strength, and low coefficient of friction. The film was not oriented. The film had a thickness of 3.5 mils.

| Layer | Function | Composition* | Weight %** |
|---|---|---|---|
| First (food-contact layer) | Heat seal layer | MCPE 96%; LDPE (w/additives) 4% | 15 |
| Second | | MCPE 90%; LDPE (w/additives) 10% | 22 |
| Third | Tie | LLDPE | 8 |
| Fourth | | Nylon 6 80%; Amorphous Nylon 20% | 6.5 |
| Fifth | Tie | LLDPE | 8 |
| Sixth | | Nylon 6 80%; Amorphous Nylon 20% | 6.5 |
| Seventh | Tie | EVA | 21 |
| Eighth | Print surface | Nylon 6 96%; Nylon 6 (w/additive) 4% | 13 |

*percentages are weight percent based on the layer weight.
**based on total thickness.
MCPE is a metallocene catalyzed polyethylene;
LDPE is a low-density polyethylene;
LLDPE is a linear low-density polyethylene;
EVA is an ethylene vinyl acetate;
additives are various slip and antiblock components.

EXAMPLE 2 (SUBSTRATE FILM)

The following eight-layer film was made using the coextrusion method. The film had excellent oxygen barrier, toughness, puncture resistance, and high seal strength. The film was not oriented.

| Layer | Function | Composition* | Weight %** |
|---|---|---|---|
| First (food-contact layer) | Heat seal layer | MCPE 88%; LDPE (w/additive) 12% | 8 |
| Second | | MCPE 90%; LDPE (w/additives) 10% | 25 |
| Third | Tie | LLDPE | 8 |
| Fourth | | Nylon 6 80%; Amorphous Nylon 20% | 6.5 |
| Fifth | Barrier | EVOH | 8 |
| Sixth | | Nylon 6 80%; Amorphous Nylon 20% | 6.5 |
| Seventh | Tie | EVA | 25 |
| Eighth | Print surface | Nylon 6 96%; Nylon 6 (w/additives) 4% | 13 |

*, **as above. The abbreviations have the same meaning as set forth above.
EVOH means ethylene vinyl alcohol.

EXAMPLE 3 (COATED, PRINTED FILM)

The following coated, printed films were made by printing a printed image onto the substrate film of Example 1, applying a radiation-curable varnish over the printed image, and curing the overprint varnish. The substrate film was surface printed using the flexographic method with 3 layers of Color Converting Industries AXL solvent-based ink (a modified cellulose alcohol reducible ink). The printed film was coated with an EB-curable overprint varnish of the type noted below. The coating was cured at the dosage and energies noted below to form a coating having the noted thickness.

| EB-Curable Overprint Varnish (Tradename) | Thickness (micro-meter) | Dosage (Megarad) | Voltage (keV) | Migration (ppb) | Gloss (%) |
|---|---|---|---|---|---|
| Mor-Quik 477 | 0.5 | 3 | 200 | <50 ppb | 79 |
| Sun Chemical GAIFB0440206 | 2.5 | 3 | 70 | <50 ppb | 89 |
| Sun Chemical GAIFB0440206 | ~2 | 3 | 165 | <50 ppb | Not Available |
| Mor-Quik 444HP | 0.6 | 3 | 200 | >50 ppb | 80 |
| Mor-Quik333 | 1.5 | 3 | 200 | >50 ppb | 92 |
| Mor-Quik 444HP | 2.1 | 3 | 200 | >50 ppb | 92 |
| Mor-Quik 444HP | 2.8 | 1.5 | 70 | >50 ppb | 91 |
| Mor-Quik 444HP | 2.8 | 3 | 100 | >50 ppb | 92 |
| Mor-Quik 444HP | 2.8 | 3 | 70 | >50 ppb | 92 |

The above EB-curable systems were discussed earlier in this application. The migration data was generated using the FDA migration test protocol (discussed above) under the conditions of a food simulant of 95% ethanol and 5% water, with 10 days at 20° C. exposure. The gloss was measured according to ASTM D 2457 (60° angle).

The first part of the table shows coated, printed films having a migration of less than 50 ppb. For the Mor-Quik 477 system, since the pre-cured coating is believed substantially free of monofunctional monomer, there is less of a chance for unreacted monomer to migrate. Since the above Sun system of EB-curable overprint varnish is believed essentially free of reactive monomer/reactive diluent, again there is less likelihood that unreacted monomer to migrate.

The second part of the table shows that that gloss of the radiation-cured varnish is generally improved at higher coating thicknesses.

EXAMPLE 4 (COATED, PRINTED FILM)

The following coated, printed films were made by printing a printed image onto the substrate film of Example 1, applying a radiation-curable varnish over the printed image, and curing the overprint varnish. The substrate film was surface printed using the same solvent-base ink system for each substrate. The printed film was coated with an EB-curable overprint varnish of the type noted below. The coating was cured to produce a target coating thickness of 2 μm with a dosage of 3 megarad.

| EB-Curable Overprint Varnish | Cure Energy (keV) | Abrasion Resistance (pixels of ink removed) | Rub Resistance (Number of NPAC rubs to break print) |
|---|---|---|---|
| Sun Chemical GAIFB0440206 | 70 | 80,200 | 77 |
| Sun Chemical GAIFB0440206 | 50 | 50,700 | >200 |
| Sun Chemical GAIFB0440206 | 45 | 18,900 | >200 |
| Rahm & Haas Mor-Quik 444HP | 200 | 38,400 | 53 |
| Rahm & Haas Mor-Quik 444HP | 100 | 57,006 | 46 |
| Rahm & Haas Mor-Quik 444HP | 70 | 37,900 | 48 |
| Rahm & Haas Mor-Quik 444HP | 50 | 19,400 | >200 |

The above EB-curable systems were discussed earlier in this application. The abrasion resistance was measured using the TMI Model 10-18-01-001 abrasion tester under the conditions as discussed earlier in this application. The rub resistance was measured using the NPAC rub test under the conditions as discussed earlier in this application.

This table illustrates that lower EB voltages for curing the radiation-curable overprint varnish, results in improved abrasion and rub resistance.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A packaged food product comprising:

a food product;

a package enclosing the food product, the package comprising a coated, printed film comprising:

a substrate film comprising one or more thermoplastic materials, the substrate film having a print side and an opposing food side and an average thickness of less than about 15 mils;

an image printed on the print side of the substrate film;

a radiation-cured varnish over the printed image, the radiation-cured varnish formed by:

coating the printed image with a radiation-curable varnish comprising one or more polymerizable reactants and optionally one or more photointiators, wherein the radiation-curable varnish includes less than about 20% monofunctional monomer based on the weight of the radiation-curable varnish; and subsequently exposing the radiation-curable varnish to radiation sufficient to polymerize at least 90 weight % of the one or more polymerizable ractants;

wherein when the coated, printed film is tested according to the FDA migration test protocol, no more than 50 parts per billion total of any of the polymerizable reactants and the optional photoinitiators migrate within 10 days at 40° C. from the coated, printed film into a food simulant selected from the group consisting of i) 95 weight % ethanol and 5 weight % water and ii) 5 weight % ethanol and 95 weight % water, the food simulant enclosed within a test container formed from the coated, printed film so that the food simulant contacts the food side of the substrate film and the ratio of volume of food simulant to surface area of coated, printed film is 10 milliliters per square inch.

2. The packaged food of claim 1 wherein:

the package comprises one or more heat-sealed regions;

a least a portion of the radiation-cured varnish extends into the heat-sealed region; and the weight of the radiation-cured varnish per unit area of substrate film in the portion of the radiation-cured varnish extending into the heat-sealed region is at least substantially equal to the weight of radiation-cured varnish per unit area of substrate film outside of the heat-sealed region.

3. The packaged food of claim 1 wherein:

the package comprises one or more heat-sealed regions;

at least a portion of the printed image extends into the heat-sealed region; and the weight of printed image per unit area of substrate film of the portion of the printed image extending into the heat-sealed region is at least substantially equal to the weight of printed image per unit area of substrate film outside of the heat-sealed region.

4. The packaged food of claim 1 wherein:

the package further comprises one or more heat-sealed regions;

the gloss of the coated, printed film in the heat-sealed regions is at least substantially equal to the gloss of the coated, printed film outside of the heat-sealed regions.

5. The packaged food of claim 1 wherein the coated, printed film is capable of being exposed to 60 psig of contact pressure between the radiation-cured varnish and an aluminum foil for 2 seconds at a temperature of at least 250° F. with less than 5 weight % of the printed image being transferred to the foil.

6. The packaged food of claim 1 wherein the substrate film comprises polyvinyl alcohol.

7. The packaged food of claim 1 wherein the substrate film has an average thickness of less than about 5 mils.

8. The packaged food of claim 1 wherein the printed image is formed by applying one or more water- or solvent-based inks to the print side of the substrate film and drying the one or more inks.

9. The packaged food of claim 1 wherein the printed image is free of photoinitiator.

10. The packaged food of claim 1 wherein the printed image is formed by applying one or more radiation-curable inks to the print side of the substrate film and curing the one or more inks.

11. The packaged food of claim 1 wherein the package enclosing the food product comprises a vertical form-fill-sealed package.

12. The packaged food of claim 1 wherein the package enclosing the food product includes a lid comprising the coated, printed film.

13. The packaged food of claim 1 wherein the radiation-cured varnish of the coated, printed film has an average gloss of at least about 80% measured in accordance with ASTM D 2457 (60° angle).

14. The packaged food of claim 1 wherein the coated, printed film has an average gloss of at leas about 80% measured in accordance with ASTM D 2457 (60° angle), has a crinkle test rating of at least 4, and can withstand at least 150 double rubs under the NPAC rub test without break in the printed image.

15. The packaged food of claim 1 wherein the average thickness of the radiation-cured varnish of the coated, printed film is less than about 5 micrometers.

16. The packaged food of claim 1 wherein the radiation-curable varnish includes less than 20% reactant diluent based on the weight of the radiation-curable varnish.

17. The packaged food product of claim 1 wherein the radiation-cured varnish is formed by:

coating the printed image with a radiation-curable varnish comprising one or more polymerizable reactants; and subsequently exposing the radiation-curable varnish to an electron-beam radiation source having an energy of less than 100 keV in an amount sufficient to polymerize at least 90 weight % of the polymerizable reactants.

18. The packaged food of claim 17 wherein the radiation-cured varnish is formed by exposing the radiation-curable varnish to an electron beam radiation source having an energy of less than about 75 keV.

19. The packaged food of claim 17 wherein the radiation-curable varnish includes less than 20% reactant diluent based on the weight of the radiation-curable varnish.

20. The packaged food of claim 17 wherein the radiation-curable varnish is cured by a free radical mechanism.

21. The packaged food of claim 1 wherein the radiation-curable varnish includes less than about 10% monofunctional monomer based on the weight of the radiation-curable varnish.

22. The packaged food of claim 1 wherein the radiation-curable varnish includes less than about 5% monofunctional monomer based on the weight of the radiation-curable varnish.

23. The packaged food of claim 1 wherein the radiation-curable varnish includes less than about 1% monofunctional monomer based on the weight of the radiation-curable varnish.

24. The packaged food of claim 1 wherein the radiation-curable varnish is essentially free of monofunctional monomer.

25. The packaged food of claim 1 wherein the radiation-curable varnish is essentially free of reactive diluent.

26. The packaged food of claim 1 wherein the radiation-curable varnish includes less than about 20% monofunctional oligomer based on the weight of the radiation-curable varnish.

27. The packaged food of claim 1 wherein the radiation-curable varnish includes less than about 10% monofunctional oligomer based on the weight of the radiation-curable varnish.

28. The packaged food of claim 1 wherein the radiation-curable varnish includes less than about 5% monofunctional oligomer based on the weight of the radiation-curable varnish.

29. The packaged food of claim 1 wherein the radiation-curable varnish includes less than about 1% monofunctional oligomer based on the weight of the radiation-curable varnish.

30. The packaged food of claim 1 wherein the radiation-curable varnish is essentially free of monofunctional oligomer.

31. The packaged food of claim 1 wherein the substrate film comprises highly crystalline polyamide.

32. The packaged food of claim 1 wherein the substrate film comprises one or more of the polymer selected from the group consisting of acrylonitrile-butadiene copolymer, isobutylene-isoprene copolymer, and polyacrylonitrile.

33. The packaged food of claim 1 wherein the substrate film comprises one or more of the polymers selected from the group consisting of highly crystalline polypropylene and highly crystalline polyethylene.

34. The packaged food of claim 1 wherein the substrate film comprises polyvinylidene chloride.

35. The packaged food of claim 1 wherein the substrate film comprises ethylene/vinyl alcohol copolymer.

36. The method of packaging food comprising the following steps:

a) providing a substrate film comprising one or more thermoplastic materials, the substrate film having a print side and an opposing food side and an average thickness of less than about 15 mils;

b) printing an image on the print side of the substrate film;

c) coating the printed image with a radiation-curable varnish comprising one or more polymerizable reactants and optionally one or more photointiators, wherein the radiation-curable varnish includes less than about 20% monofunctional monomer based on the weight of the radiation-curable varnish; and d) subsequently exposing the radiation-curable varnish to radiation sufficient to polymerize at least 90 weight % of the one or more polymerizable reactants to produce a coated, printed film comprising a radiation-cured varnish, wherein:

when the coated, printed film is tested according to the FDA migration test protocol, no more than 50 parts per billion total of any of the polymerizable reactants and the optional photoinitiators migrate within 10 days at 40° C. from the coated, printed film into a food simulant selected from the group consisting of i) 95 weight % ethanol and 5 weight % water and ii) 5 weight % ethanol and 95 weight % water, the food simulant enclosed within a test container formed from the coated, printed film so that the food simulant contacts the food side of the substrate film and the ratio of volume of food simulant to surface area of coated, printed film is 10 milliliters per square inch;

e) forming a package comprising the coated, printed film; and f) enclosing a food within the package so that the food side of the substrate film faces the enclosed food.

37. The method of claim 36 wherein the forming step comprises heat sealing the coated, printed film to form one or more heat-sealed regions, wherein at least a portion of the radiation-cured varnish extends into the heat-sealed region and the weight of the radiation-cured varnish per unit area of substrate film in the portion of the radiation-cured varnish extending into the heat-sealed region is at least substantially equal to the weight of radiation-cured varnish per unit area of substrate film outside of the heat-sealed region.

38. The method of claim 36 wherein the forming step comprises heat sealing the coated, printed film to form one or more heat-sealed regions, wherein at least a portion of the printed image extends into the heat-sealed region and the weight of the printed image per unit area of substrate film extending into the heat-sealed region is at least substantially equal to the weight of printed image per unit area of substrate film outside of the heat-sealed region.

39. The method of claim 36 wherein the forming step comprises heat sealing the coated, printed film to form one or more heat-sealed regions, wherein the gloss of the coated, printed film in the heat-sealed regions is at least substantially equal to the gloss of the coated, printed film outside of the heat-sealed regions.

40. The method of claim 36 wherein the substrate film comprises polyvinyl alcohol.

41. The method of claim 36 wherein the substrate film has an average thickness of less than about 5 mils.

42. The method of claim 36 wherein the printing step comprises applying one or more water- or solvent-based inks to the print side of the substrate film and drying the one or more inks.

43. The method of claim 36 wherein the printed image is free of photoinitiator.

44. The method of claim 36 wherein the printing step comprises applying one or more radiation-curable inks to the print side of the substrate film and curing the one or more inks.

45. The method of claim 36 wherein the forming step comprises making a vertical form-fill-sealed package.

46. The method of claim 36 wherein the package comprises a lid comprising the coated, printed film.

47. The method of claim 36 wherein the radiation-cured varnish of the coated, printed film has an average gloss of at least about 80% measured in accordance with ASTM D 2457 (60° angle).

48. The method of claim 36 wherein the coated, printed film has an average gloss of at least about 80% measured in accordance with ASTM D 2457 (60° angle), has a crinkle test rating of at least 4, and can withstand at least 150 double rubs under the NPAC rub test without break in the printed image.

49. The method of claim 36 wherein the average thickness of the radiation-cured varnish of the coated, printed film is less than about 5 micrometers.

50. The method of claim 36 wherein the radiation-curable varnish includes less than 20% reactant diluent based on the weight of the radiation-curable varnish.

51. The method of claim 36 wherein the exposing step comprises exposing the radiation-curable varnish to an electron-beam radiation source having an energy of less than 100 keV in an amount sufficient to polymerize at least 90 weight % of the polymerizable reactants.

52. The method of claim 36 wherein the exposing step comprises exposing the radiation-curable varnish to an electron beam radiation source having an energy of less than about 75 keV.

53. The method of claim 36 wherein the radiation-curable varnish comprises less than about 10% monofunctional monomer based on the weight of the radiation-curable varnish.

54. The method of claim 36 wherein the radiation-curable varnish comprises less than about 5% monofunctional monomer based on the weight of the radiation-curable varnish.

55. The method of claim 36 wherein the radiation-curable varnish comprises less than about 1% monofunctional monomer based on the weight of the radiation-curable varnish.

56. The method of claim 36 wherein the radiation-curable varnish is essentially free of monofunctional monomer.

57. The method of claim 36 wherein the radiation-curable varnish is essentially free of reactive diluent.

58. The method of claim 36 wherein the radiation-curable varnish comprises less than about 20% monofunctional oligomer based on the weight of the radiation-curable varnish.

59. The method of claim 36 wherein the radiation-curable varnish comprises less than about 10% monofunctional oligomer based on the weight of the radiation-curable varnish.

60. The method of claim 36 wherein the radiation-curable varnish comprises less than about 5% monofunctional oligomer based on the weight of the radiation-curable varnish.

61. The method of claim 36 wherein the radiation-curable varnish comprises less than about 1% monofunctional oligomer based on the weight of the radiation-curable varnish.

62. The method of claim 36 wherein the radiation-curable varnish is essentially free of monofunctional oligomer.

63. The method of claim 36 wherein the substrate film comprises highly crystalline polyamide.

64. The method of claim 36 wherein the substrate film comprises one or more of the polymers selected from the group consisting of acrylonitrile-butadiene copolymer, isobutylene-isoprene copolymer, and polyacrylonitrile.

65. The method of claim 36 wherein the substrate film comprises one or more of the polymers selected from the group consisting of highly crystalline polypropylene and highly crystalline polyethylene.

66. The method of claim 36 wherein the substrate film comprises polyvinylidene chloride.

67. The method of claim 36 wherein the substrate film comprises ethylene/vinyl alcohol copolymer.

68. The method of claim 36 further comprising the step:

g) subsequently heating the package to shrink the coated, printed film.

69. The method of claim 36 further comprising the step:

g) subsequently heating the package to cook the enclosed food.

70. The method of claim 36 wherein the food side of the substrate film contacts the enclosed food.

71. The method of claim 36 wherein the package is formed by heat-sealing the coated, printed film to produce a bag.

72. The method of claim 36 wherein the package is formed by sealing the coated, printed film to tray to enclose the food.

* * * * *

UNITED STATES PATENT AND TRADEMARK OFFICE

CERTIFICATE OF CORRECTION

PATENT NO. : 7,063,882 B2 
APPLICATION NO. : 10/920866
DATED : June 20, 2006
INVENTOR(S) : Mendy J. Mossbrook, David R. Kyle and Marc A. Edlein It is certified that error appears in the above-identified patent and that said Letters Patent is hereby corrected as shown below:

Column 24, lines 43-44, “ractants” should be --reactants--.

Column 24, line 58 “food” should be --food product-- and line 60 “a least” should be --at least--.

Column 25, line 1 “food” should be --food product--.

Column 25, line 10 “food” should be --food product--.

Column 25, line 16 “food” should be --food product--.

Column 25, line 22 “food” should be --food product--.

Column 25, line 24 “food” should be --food product--.

Column 25, line 26 “food” should be --food product--.

Column 25, line 30 “food” should be --food product--.

Column 25, line 32 “food” should be --food product--.

Column 25, line 36 “food” should be --food product--.

Column 25, line 39 “food” should be --food product--.

Column 25 line 42 “food” should be --food product--.

Column 25, line 46 “food” should be --food product-- and line 47 “at leas” should be --at least--.

Column 25, line 52 “food” should be --food product--.

Column 25, line 55 “food” should be --food product--.

Column 25, line 66 “food” should be --food product--.

Column 26, line 3 “food” should be --food product--.

Column 26, line 6 “food” should be --food product--.

Column 26, line 8 “food” should be --food product--.

UNITED STATES PATENT AND TRADEMARK OFFICE

CERTIFICATE OF CORRECTION

PATENT NO. : 7,063,882 B2
APPLICATION NO. : 10/920866
DATED : June 20, 2006
INVENTOR(S) : Mendy J. Mossbrook, David R. Kyle and Marc A. Edlein It is certified that error appears in the above-identified patent and that said Letters Patent is hereby corrected as shown below:

Column 26, line 12 “food” should be --food product--.

Column 26, line 16 “food” should be --food product--.

Column 26, line 20 “food” should be --food product--.

Column 26, line 23 “food” should be --food product--.

Column 26, line 25 “food” should be --food product--.

Column 26, line 29 “food” should be --food product--.

Column 26, line 33 “food” should be --food product--.

Column 26, line 37 “food” should be --food product--.

Column 26, line 41 “food” should be --food product--.

Column 26, line 44 “food” should be --food product--.

Column 26, line 46 “food” should be --food product-- and line 47 “the polymer” should be --the polymers--.

Column 26, line 50 “food” should be --food product--.

Column 26, line 54 “food” should be --food product--.

Column 26, line 56 “food” should be --food product--.

Column 26, line 58 “the method” should be --A method--.

Column 30, line 9 after claim 72, please insert the following claims 73 through 96:

--73. A packaged food product comprising:

a food product;

a package enclosing the food product, the package comprising a coated, printed film comprising:

a substrate film comprising one or more thermoplastic materials, the substrate film having a print side and an opposing food side and an average thickness of less than about 15 mils;

an image printed on the print side of the substrate film;

CERTIFICATE OF CORRECTION

PATENT NO. : 7,063,882 B2
APPLICATION NO. : 10/920866
DATED : June 20, 2006
INVENTOR(S) : Mendy J. Mossbrook, David R. Kyle and Marc A. Edlein It is certified that error appears in the above-identified patent and that said Letters Patent is hereby corrected as shown below:

Column 30, line 9 after claim 72, please insert the following claims 73 through 96: (cont'd)

a radiation-cured varnish over the printed image, the radiation-cured varnish formed by:

coating the printed image with a radiation-curable varnish comprising one or more polymerizable reactants and optionally one or more photointiators; and subsequently exposing the radiation-curable varnish to radiation sufficient to polymerize at least 90 weight % of the polymerizable reactants;

wherein the package comprises one or more heat-sealed regions and at least a portion of the radiation-cured varnish extends into the heat-sealed region; and wherein the weight of the radiation-cured varnish per unit area of substrate film in the portion of the radiation-cured varnish extending into the heat-sealed region is at least substantially equal to the weight of radiation-cured varnish per unit area of substrate film outside of the heat-sealed region.

74. The packaged food product of claim 73 wherein:

at least a portion of the printed image extends into the heat-sealed region; and the weight of printed image per unit area of substrate film of the portion of the printed image extending into the heat-sealed region is at least substantially equal to the weight of printed image per unit area of substrate film outside of the heat-sealed region.

75. The packaged food product of claim 73 wherein the gloss of the coated, printed film in the heat-sealed regions is at least substantially equal to the gloss of the coated, printed film outside of the heat-sealed regions.

76. The packaged food product of claim 73 wherein the coated, printed film is capable of being exposed to 60 psig of contact pressure between the radiation-cured varnish and an aluminum foil for 2 seconds at a temperature of at least 250·F with less than 5 weight % of the printed image being transferred to the foil.

77. The packaged food product of claim 73 wherein the package enclosing the food product comprises a vertical form-fill-sealed package.

78. The packaged food product of claim 73 wherein the package enclosing the food product includes a lid comprising the coated, printed film.

CERTIFICATE OF CORRECTION

PATENT NO. : 7,063,882 B2
APPLICATION NO. : 10/920866
DATED : June 20, 2006

INVENTOR(S) : Mendy J. Mossbrook, David R. Kyle and Marc A. Edlein

It is certified that error appears in the above-identified patent and that said Letters Patent is hereby corrected as shown below:

Column 30, line 9 after claim 72, please insert the following claims 73 through 96: (cont'd)

79. The packaged food product of claim 73 wherein the radiation-cured varnish of the coated, printed film has an average gloss of at least about 80% measured in accordance with ASTM D 2457 (60- angle).

80. A packaged food product comprising:
a food product;
a package enclosing the food product, the package comprising a coated, printed film comprising:
a substrate film comprising one or more thermoplastic materials, the substrate film having a print side, an opposing food side, and an average thickness of less than about 15 mils;
an image printed on the print side of the substrate film;
a radiation-cured varnish over the printed image, the radiation-cured varnish formed by:
coating the printed image with a radiation-curable varnish comprising one or more polymerizable reactants; and
subsequently exposing the radiation-curable varnish to an electron-beam radiation source having an energy of less than 100 keV in an amount sufficient to polymerize at least 90 weight % of the polymerizable reactants.

81. The packaged food product of claim 80 wherein the radiation-cured varnish is formed by exposing the radiation-curable varnish to an electron beam radiation source having an energy of less than about 75 keV.

82. The packaged food product of claim 80 wherein the radiation-curable varnish includes less than 20 % monofunctional monomer based on the weight of the radiation-curable varnish.

83. The packaged food product of claim 80 wherein the radiation-curable varnish includes less than 20 % reactant diluent based on the weight of the radiation-curable varnish.

84. The packaged food product of claim 80 wherein the radiation-curable varnish is cured by a free radical mechanism.

85. The packaged food product of claim 80 wherein the substrate film comprises highly crystalline polyamide.

UNITED STATES PATENT AND TRADEMARK OFFICE

CERTIFICATE OF CORRECTION

PATENT NO. : 7,063,882 B2
APPLICATION NO. : 10/920866
DATED : June 20, 2006

INVENTOR(S) : Mendy J. Mossbrook, David R. Kyle and Marc A. Edlein

It is certified that error appears in the above-identified patent and that said Letters Patent is hereby corrected as shown below:

Column 30, line 9 after claim 72, please insert the following claims 73 through 96: (cont'd)

86. The packaged food product of claim 80 wherein the substrate film comprises one or more of the polymers selected from the group consisting of acrylonitrile-butadiene copolymer, isobutylene-isoprene copolymer, and polyacrylonitrile.

87. The packaged food product of claim 80 wherein the substrate film comprises one or more of the polymers selected from the group consisting of highly crystalline polypropylene and highly crystalline polyethylene.

88. The packaged food product of claim 80 wherein the substrate film comprises polyvinylidene chloride.

89. The packaged food product of claim 80 wherein the substrate film comprises ethylene/vinyl alcohol copolymer.

90. The packaged food product of claim 80 wherein the substrate film comprises polyvinyl alcohol.

91. The packaged food product of claim 80 wherein the substrate film has an average thickness of less than about 5 mils.

92. The packaged food product of claim 80 wherein the printed image is formed by applying one or more water- or solvent-based inks to the print side of the substrate film and drying the one or more inks.

93. The packaged food product of claim 80 wherein the printed image is free of photoinitiator.

94. The packaged food product of claim 80 wherein the printed image is formed by applying one or more radiation-curable inks to the print side of the substrate film and curing the one or more inks.

95. The packaged food product of claim 80 wherein the coated, printed film has an average gloss of at least about 80% measured in accordance with ASTM D 2457 (60· angle), has a crinkle test rating of at least 4, and can withstand at least 150 double rubs under the NPAC rub test without break in the printed image.

UNITED STATES PATENT AND TRADEMARK OFFICE

CERTIFICATE OF CORRECTION

PATENT NO. : 7,063,882 B2
APPLICATION NO. : 10/920866
DATED : June 20, 2006
INVENTOR(S) : Mendy J. Mossbrook, David R. Kyle and Marc A. Edlein It is certified that error appears in the above-identified patent and that said Letters Patent is hereby corrected as shown below:

Column 30, line 9 after claim 72, please insert the following claims 73 through 96: (cont'd)

96. The packaged food product of claim 80 wherein the average thickness of the radiation-cured varnish of the coated, printed film is less than about 5 micrometers.

Signed and Sealed this

Eleventh Day of September, 2007

JON W. DUDAS
*Director of the United States Patent and Trademark Office*